Sept. 22, 1964     R. C. BASKELL     3,149,413
ASSEMBLY TOOL
Filed May 16, 1961
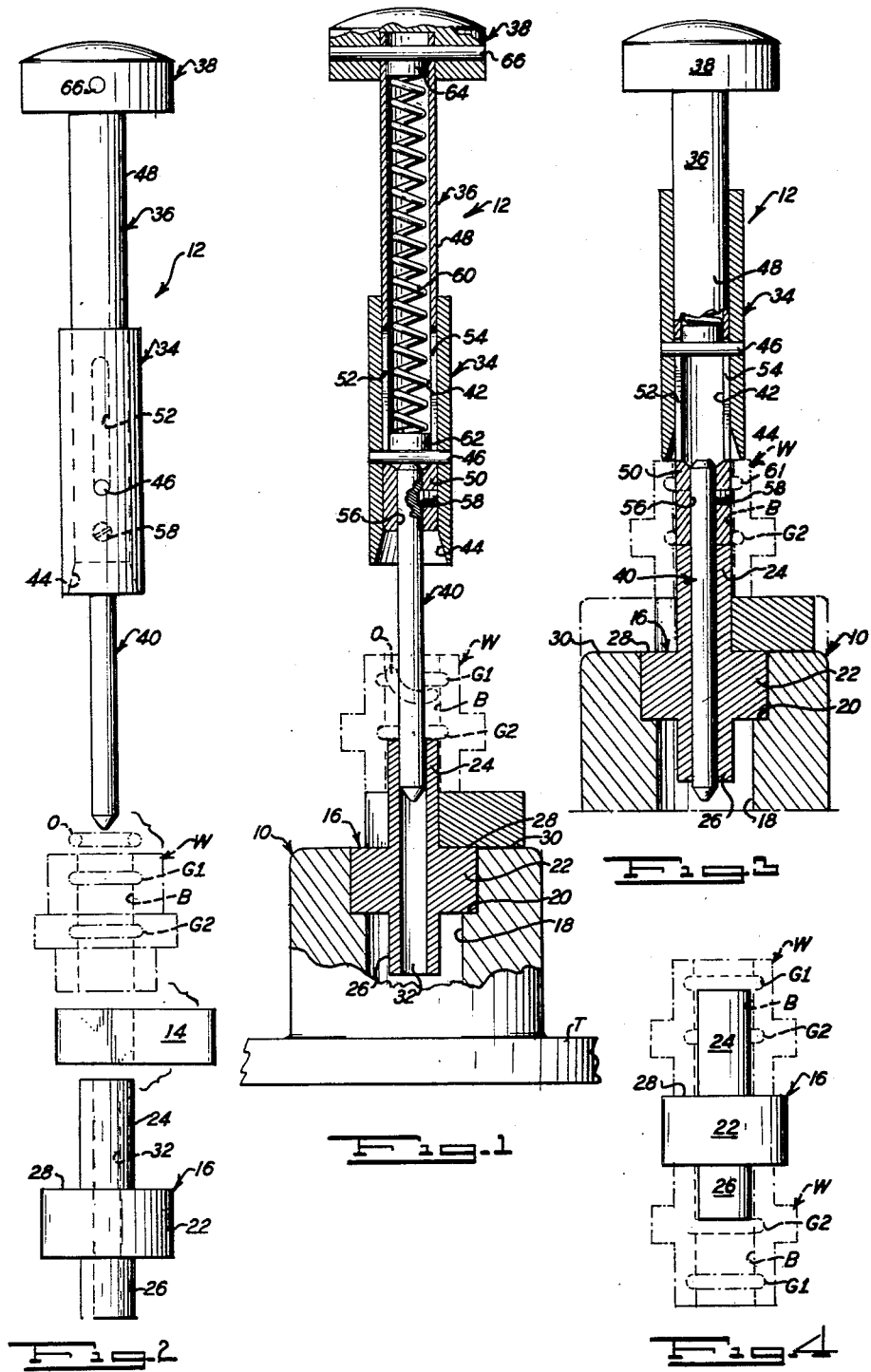

United States Patent Office 3,149,413
Patented Sept. 22, 1964

3,149,413
ASSEMBLY TOOL
Raymond C. Baskell, Trumbull, Conn., assignor to
Jenkins Bros., Bridgeport, Conn.
Filed May 16, 1961, Ser. No. 110,387
9 Claims. (Cl. 29—235)

This invention relates to assembly tools and more particularly to techniques for assembling toroidal elements in supporting bodies.

A particular problem contemplated by the invention relates to the assembly operation involving depositing an O-ring in an annular groove encircling a bore within a work piece and, with respect to this problem, it is an object of the invention to provide improved techniques and apparatus to facilitate said operation.

More particularly, it is an object of the invention to provide improved techniques and apparatus whereby an O-ring may be positioned in an annular groove efficiently, precisely and without damage.

Further, it is an object of the invention to permit the locating of O-rings and the like in remote and inaccessible positions within supporting bodies.

To achieve the above and other of its objectives, the invention contemplates the provision of an assembly tool for positioning a toroid in an annular groove encircling a bore in a work piece at a determinable depth within the latter. According to the invention, there are provided means to support the work piece and penetrate the bore from one end thereof to the extent of said depth and means to penetrate the bore from the other end thereof to the extent of abutting the first said means while carrying said toroid before it whereby the toroid is deposited in said groove.

According to a feature of the invention, provision may be made of a single tool adapted for depositing O-rings and the like at different depths within a work piece. According to one embodiment of the invention, such a provision is possible by means of a selectively usable spacer, the details of which will become hereinafter apparent. Alternatively, it is possible to provide a tool element selectively positionable with respect to an anvil to accomplish the same result, as will also be hereinafter explained in greater detail.

The invention will be more clearly understood from the following detailed description of some preferred embodiments, as illustrated in the accompanying drawing in which:

FIGURE 1 is a partially sectional view of an assembly tool of the invention prepared for inserting an O-ring in a work piece;

FIGURE 2 is an exploded elevational view of various of the components illustrated in FIG. 1;

FIGURE 3 is a partially sectional view illustrating the apparatus of FIG. 1 with the O-ring having been positioned; and FIGURE 4 is a view showing a possibility of using an element of FIG. 1 in inverted position for purposes of depositing O-rings at various depths.

The assembly tool illustrated in the drawing generally comprises a base member 10 and a hammer member 12. A bifurcated spacer 14 may also be employed.

In the drawing, base member 10 is shown positioned on a table T, the apparatus being adapted for positioning an O-ring O in annular grooves G1 and G2 which encircle and are concentric with a bore B extending through a work piece W. Grooves G1 and G2 open inwardly into bore B and are located at varying depths within the work piece W, or in other words, are displaced by different axial extents along said bore.

Also constituting a basic element of the assembly tool illustrated is the detachable insert 16, the purpose of which will become hereinafter apparent.

Base member 10 may be fabricated, for example, of aluminum, steel, or the like, and is provided with an upwardly extending opening 18 in which a shoulder 20 provides a support for the detachable insert 16.

The detachable insert 16 includes a first section 22 having a shape corresponding to that of the upper portion of opening 18, section 22 being adapted for being supported directly against the shoulder 20.

Insert 16 further includes a second section 24 extending vertically upward from section 22 and having a generally cylindrical shape. The diameter of section 24 is substantially equal to, but less than, the diameter of bore B, whereby the work piece W is adapted for being slidably and detachably accommodated on the section 24.

Detachable insert 16 is furthermore provided with an additional section 26, the purpose of which will be hereinafter explained.

Additionally, it is to be noted that the top 28 of section 22 is preferably planar and merges with the top 30 of the base member 10.

Finally, with respect to detachable insert 16, it is to be noted that this member is provided with a bore or opening 32 having a particular determinable diameter, the use of which will be hereinafter made apparent.

Hammer member 12 includes a cylindrical sleeve 34, a cylindrical anvil 36, a head 38 and a rod 40.

Cylindrical sleeve 34 is preferably fabricated of aluminum or steel, or the like, and is provided with an inner cylindrical bore 42, the diameter of which is substantially equal to the diameter of the bore B in work piece W. Bore 42 flares outwardly at an angle of about 15° to a diameter substantially equal to about the outer diameter of grooves G1 and G2 and O-ring O. Thus, the inner end of sleeve 34 is constituted by a flared portion 44.

With further regard to sleeve 34, it will be noted that this sleeve is diametrally penetrated by a pin 46 affixed to said sleeve.

The anvil 36, slidably accommodated within the sleeve 34, comprises generally a first portion 48, which is hollow, and a second portion 50, which is for the most part solid. Hollow portion 48 is provided with diametrally opposed and axially elongated slots 52 and 54 within which is accommodated pin 46 which thereby limits the extent of relative movement possible between the sleeve 34 and anvil 36.

Solid portion 50, which is of generally cylindrical form, has a diameter which is substantially equal to, but slightly less than, the diameter of bore 42 of sleeve 34. Moreover, solid portion 50 is provided with an axial opening 56 within which is accommodated rod 40. Rod 40 is fixed to solid portion 50 by means of a set screw 58.

Within the hollow portion 48 of anvil 36 is located a resilient or yieldable device such as the helical spring 60 which engages at opposite ends against wafers 62 and 64. The wafer 64, in turn, engages against pin 66 by means of which head 38 is affixed to anvil 36, the spring 60 thus urging the head 38 and the anvil 36 towards a predetermined position of rest relative to pin 46 and thus relative to the hollow sleeve 34. The position of rest is as illustrated in FIG. 1.

Rod 40 is provided with a diameter substantially equal to, but slightly less than, the diameter of bore 32 and is therefore adapted to penetrate into the latter said bore. This enables the rod 40 to serve as a guide for the hammer member 12 and thus for the anvil 36.

For inserting an O-ring into one of the grooves in the work piece W, the bifurcated spacer 14 is employed or not, depending upon which of the grooves the O-ring is to be inserted in. The height of spacer 14 is equal to the axial spacing between corresponding portions of grooves G1 and G2 and the work piece W is positioned either atop of the spacer 14 or atop section 22 of detachable insert 16. The selective use of spacer 14 governs the extent by which section 24 of detachable insert 16 penetrates into the bore B of work piece W, the section 24 being intended to penetrate said bore to a position adjacent the groove in which the O-ring is to be deposited. The top of section 24 thus obturates the bore B and serves as a stop or abutment for the solid portion 50 of the anvil 36.

With the work piece positioned as shown in phantom lines in FIG. 1, an O-ring is next positioned in the flared portion 44 at the bottom of sleeve 34. Rod 40 is then inserted through bore B into the bore 32 of detachable insert 16. Hammer member 12 is then moved vertically downward until it rests on the top of the work piece W. A force is then applied vertically downward on the top of head 38 so that the solid portion 50 of the anvil urges the O-ring O downwardly through bore B to a position whereat the O-ring encounters the top of section 24. The O-ring no longer having freedom for axial movement through bore B snaps into position into the adjacent groove, the solid portion 50 continuing through the center of the O-ring until it encounters section 24 of detachable insert 16. With the O-ring thus in position, spring 60, with head 38 released, urges the anvil upwardly relative to sleeve 34 leaving the O-ring in position in the groove.

It will be apparent from an inspection of FIGS. 1–3 that if spacer 14 were to be removed, the work piece W would be positioned further down along section 24 so that the top of the latter would be adjacent groove G1. This would enable the positioning of an O-ring within the latter said groove.

Alternatively, and as indicated in FIG. 4, detachable insert 16 can be employed in inverted position whereby on the one hand section 24 enables the positioning of the O-ring in one of the grooves in bore B and section 26 enables the positioning of an O-ring in a groove displaced axially therefrom.

The apparatus of the invention is readily and economically manufactured and has proved in practice to enable the rapid, efficient and precise positioning of O-rings in grooves of the nature indicated without damage. It is apparent from the above description that this locating of O-ring is effected in normally remote and inaccessible positions within bodies intended for the support thereof.

There will now be obvious to those skilled in the art many modifications and variations of the apparatus set forth above. These modifications will not depart from the scope of the invention, however, if defined by the following claims.

What is claimed is:

1. For inserting an O-ring into an annular groove opening inwardly toward a concentric cylindrical bore in a work piece, said O-ring and groove having substantially the same outer diameter and said bore being of lesser diameter, said groove being set into said work piece by a determinable axial extent along said bore; apparatus comprising a base member provided with an upwardly extending opening and including a shoulder in said opening, a detachable insert including a first section receivable in said opening and adapted for being supported by said shoulder and a second section on said first section and extending upwardly therefrom, said second section being cylindrical and having an outer diameter corresponding to but less than the diameter of said bore and being provided in turn with a concentric inner cylindrical bore of determinable diameter, said second section having a height corresponding to the said axial extent by which said groove is displaced into said work piece; an anvil slidable in the bore of said work piece; and a rod on the anvil and having a diameter substantially equal to but less than the diameter of the bore of the second section of the detachable insert whereby said rod serves as a guide for said anvil to drive said O-ring via the bore of said work piece into said groove, said second section of said detachable insert serving as a stop for said anvil.

2. For inserting an O-ring into a corresponding annular groove opening inwardly toward a concentric cylindrical bore in a work piece, said O-ring and groove having substantially the same outer diameter and said bore being of lesser diameter, said groove being displaced into said work piece by a determinable axial extent along said bore; apparatus comprising a base member provided with an upwardly extending opening and including a shoulder in said opening, a detachable insert including a first section receivable in said opening and adapted for being supported by said shoulder and a second section on said first section and extending upwardly therefrom, said second section being cylindrical and having an outer diameter corresponding to but less than the diameter of said bore and being provided in turn with a concentric inner cylindrical bore of determinable diameter, said second section having a height corresponding to the said axial extent by which said groove is displaced into said work piece; and a hammer member including a cylindrical sleeve having a bore with a diameter corresponding to that of the bore in said work piece, the bore of said sleeve at one end thereof having a flared portion flaring to substantially the outer diameter of said O-ring, a cylindrical anvil slidable in the bore of said sleeve, and a rod on and extending axially from the anvil, said rod having a diameter substantially equal to but less than the diameter of the bore of the second section of the detachable insert whereby said rod serves as a guide for said anvil to drive said O-ring from the flared portion of the bore of said sleeve via the bore of said work piece into said groove, said second section of said detachable insert serving as a stop for said anvil.

3. For inserting an O-ring into an annular groove opening inwardly toward a concentric cylindrical bore in a work piece, said O-ring and groove having substantially the same outer diameter and said bore being of lesser diameter, said groove being displaced into said work piece by a determinable axial extent along said bore; apparatus comprising a base member provided with an upwardly extending opening and including a shoulder in said opening, a detachable insert including a first section receivable in said opening and adapted for being supported by said shoulder and a second section on said first section and extending upwardly therefrom, said second section being cylindrical and having an outer diameter corresponding to but less than the diameter of said bore, said second section having a height corresponding to the said axial extent by which said groove is displaced into said work piece; and a hammer member including a cylindrical sleeve having a bore with a diameter corresponding to that of the bore in said work piece, the bore of said sleeve at one end thereof having a flared portion flaring to substantially the outer diameter of said O-ring, a cylindrical anvil slidable in the bore of said sleeve and including a first hollow portion concentric with said sleeve and having diametrally opposed axially elongated slots and a second solid portion having a diameter substantially equal to that of the second section of said detachable insert, a pin diametrally disposed on said sleeve and extending through said slots to limit displacement of said anvil relative to said sleeve, a head on the first portion of said anvil outside of and above said sleeve whereby forces may be applied to said anvil, and a spring in the hollow portion of the anvil, said spring being effectively between said head and said pin to urge said head toward a normal position of rest relative to said sleeve and pin, said anvil being adapted to drive said O-ring from the flared portion of the bore of said sleeve via the bore of said work piece into said groove, said second section of said detachable insert serving as a stop for said anvil.

4. For inserting an O-ring into an annular groove opening inwardly toward a concentric cylindrical bore in a work piece, said O-ring and groove having substantially the same outer diameter and said bore being of lesser diameter, said groove being displaced into said work piece by a determinable axial extent along said bore; apparatus comprising a base member provided with an upwardly extending opening and including a shoulder in said opening, a detachable insert including a first section receivable in said opening and adapted for being supported by said shoulder and a second section on said first section and extending upwardly therefrom, said second section being cylindrical and having an outer diameter corresponding to but less than the diameter of said bore and being provided in turn with a concentric inner cylindrical bore of determinable diameter, said second section having a height corresponding to the said axial extent by which said groove is displaced into said work piece; and a hammer member including a cylindrical sleeve, an anvil slidable in said sleeve and including a first portion concentric with said sleeve and having diametrally opposed axially elongated slots and a second portion having a diameter substantially equal to that of the second section of said detachable insert, a pin diametrally disposed on said sleeve and extending through said slots to limit displacement of said anvil relative to said sleeve, and a rod on and extending axially from the solid portion of the anvil, said rod having a diameter substantially equal to but less than the diameter of the bore of the second section of the detachable insert whereby said rod serves as a guide for said anvil to drive said O-ring via the bore of said work piece into said groove, said second section of said detachable insert serving as a stop for said anvil.

5. For inserting an O-ring into an annular groove opening inwardly toward a concentric cylindrical bore in a work piece, said O-ring and groove having substantially the same outer diameter and said bore being of lesser diameter, said groove being displaced into said work piece by a determinable axial extent along said bore; apparatus comprising a base member provided with an opening, a detachable insert in said opening and extending upwardly from said base member, said insert being cylindrical and having an outer diameter corresponding to but less than the diameter of said bore and being provided in turn with a concentric inner cylindrical bore of determinable diameter, said insert having a height above said base member corresponding to the said axial extent by which said groove is displaced into said work piece; and a hammer member including a cylindrical sleeve having a bore with a diameter corresponding to that of the bore in said work piece, the bore of said sleeve at one end thereof having a flared portion flaring to substantially the outer diameter of said O-ring, a cylindrical anvil slidable in the bore of said sleeve and including a first hollow portion concentric with said sleeve and having diametrally opposed axially elongated slots and a second solid portion having a diameter substantially equal to that of said insert, a pin diametrally disposed on said sleeve and extending through said slots to limit displacement of said anvil relative to said sleeve, a head on the first portion of said anvil outside of and above said sleeve whereby forces may be applied to said anvil, a spring in the hollow portion of the anvil, said spring being effectively between said head and said pin to urge said head toward a normal position of rest relative to said sleeve and pin, and a rod on and extending axially from the solid portion of the anvil, said rod having a diameter substantially equal to but less than the diameter of the bore of the insert whereby said rod serves as a guide for said anvil to drive said O-ring from the flared portion of the bore of said sleeve via the bore of said work piece into said groove, said detachable insert serving as a stop for said anvil.

6. For inserting an O-ring into an annular groove encircling cylindrical bore in a work piece, said O-ring and groove having substantially the same outer diameter and said bore being of lesser diameter, said groove being displaced into said work piece by a determinable axial extent along said bore; apparatus comprising a cylindrical section having an outer diameter substantially equal to but less than the diameter of said bore and being provided with a concentric cylindrical bore of determinable diameter, said section having a height corresponding to the said axial extent by which said groove is displaced into said work piece; and a hammer member including a cylindrical sleeve having a bore with a diameter corresponding to that of the bore in said work piece, the bore of said sleeve at one end thereof having a flared portion flaring to a diameter substantially equal to the outer diameter of said O-ring, a cylindrical anvil slidable in the bore of said sleeve and including a first hollow portion concentric with said sleeve and having diametrally opposed axially elongated slots and a second solid portion having a diameter substantially equal to that of said section, a pin diametrally disposed on said sleeve and extending through said slots to limit displacement of said anvil relative to said sleeve, a head on the first portion of said anvil outside of and above said sleeve whereby forces may be applied to said anvil, a spring in the hollow portion of the anvil, said spring being located between said head and said pin to urge said head toward a normal position of rest relative to said sleeve and pin, and a rod on and extending axially from the solid portion of the anvil, said rod having a diameter substantially equal to but less than the diameter of the bore of said section whereby said rod serves as a guide for said anvil to drive said O-ring from the flared portion of the bore of said sleeve via the bore of said work piece into said groove, said section serving as a stop for said anvil.

7. Apparatus for inserting an O-ring into a corresponding annular groove opening inwardly toward a concentric cylindrical bore in a work piece, said O-ring and groove having substantially the same outer diameter and said bore being of lesser diameter, said groove being set into said work piece by a determinable axial extent along said bore; said apparatus comprising a base member provided with an upwardly extending opening and including a shoulder in said opening, a detachable insert including a first section receivable in said opening and adapted for being supported by said shoulder and a second section on said first section and extending upwardly therefrom, said second section being cylindrical and having an outer diameter corresponding to but less than the diameter of said bore and being provided in turn with a concentric inner cylindrical bore of determinable diameter, said second section having a height corresponding to the said axial extent by which said groove is displaced into said work piece; and a hammer member including a cylindrical sleeve having a bore with a diameter corresponding to that of the bore in said work piece, the bore of said sleeve at one end thereof having a flared portion flaring to substantially the outer diameter of said O-ring, a cylindrical anvil slidable in the bore of said sleeve and including a first hollow portion concentric with said sleeve and having diametrally opposed axially elongated slots and a second solid portion having a diameter substantially equal to that of the second section of said detachable insert, a pin diametrally disposed on said sleeve and extending through said slots to limit displacement of said anvil relative to said sleeve, a head on the first portion of said anvil outside of and above said sleeve whereby forces may be applied to said anvil, a spring in the hollow portion of the anvil, said spring being effectively between said head and said pin to urge said head toward a normal position of rest relative to said sleeve and pin, and a rod on and extending axially from the solid portion of the anvil, said rod having a diameter substantially equal to but less than the diameter of the bore of the second section of the detachable insert whereby said rod serves as a guide for said anvil to drive said O-ring from the flared portion of the bore of said sleeve via the bore of said work piece into said groove, said second section of said detachable insert serving as a stop for said anvil.

8. Apparatus for inserting an O-ring into one of a plurality of corresponding annular grooves opening inwardly toward a concentric cylindrical bore in a work piece, said O-ring and grooves having substantially the same outer diameter and said bore being of lesser diameter, said grooves being displaced into said work piece by different determinable axial extents along said bore; said apparatus comprising a base member provided with an upwardly extending opening and including a shoulder in said opening, a detachable insert including a first section receivable in said opening and adapted for being supported by said shoulder and second sections on said first section and extending in opposite directions therefrom, said second sections being cylindrical and having an outer diameter corresponding to but less than the diameter of said bore and being provided in turn with a concentric inner cylindrical bore of determinable diameter, said second sections having respective heights corresponding to the said axial extents by which said grooves are displaced into said work piece; and a hammer member including a cylindrical sleeve having a bore with a diameter corresponding to that of the bore in said work piece, the bore of said sleeve at one end thereof having a flared portion flaring to substantially the outer diameter of said O-ring, a cylindrical anvil slidable in the bore of said sleeve and including a first hollow portion concentric with said sleeve and having diametrally opposed axially elongated slots and a second solid portion having a diameter substantially equal to that of the second section of said detachable insert, a pin diametrally disposed on said sleeve and extending through said slots to limit displacement of said anvil relative to said sleeve, a head on the first portion of said anvil outside of and above said sleeve whereby forces may be applied to said anvil, a spring in the hollow portion of the anvil, said spring being effectively between said head and said pin to urge said head toward a normal position of rest relative to said sleeve and pin, and a rod on and extending axially from the solid portion of the anvil, said rod having a diameter substantially equal to but less than the diameter of the bores of the second sections of the detachable insert whereby said rod serves as a guide for said anvil to drive said O-ring from the flared portion of the bore of said sleeve via the bore of said work piece into said groove, said second sections of said detachable insert selectively serving as stops for said anvil.

9. Apparatus for inserting an O-ring into one of a plurality of corresponding annular grooves opening inwardly toward a concentric cylindrical bore in a work piece, said O-ring and grooves having substantially the same outer diameter and said bore being of lesser diameter, said grooves being set into said work piece by different determinable axial extents along said bore; said apparatus comprising a base member provided with an upwardly extending opening and including a shoulder in said opening; a detachable insert including a first section receivable in said opening and adapted for being supported by said shoulder and a second section on said first section and extending upwardly therefrom, said second section being cylindrical and having an outer diameter corresponding to but less than the diameter of said bore and being provided in turn with a concentric inner cylindrical bore of determinable diameter, said second section having a height corresponding to the said axial extent by which said groove is displaced into said work piece; a hammer member including a cylindrical sleeve having a bore with a diameter corresponding to that of the bore in said work piece, the bore of said sleeve at one end thereof having a flared portion flaring to substantially the outer diameter of said O-ring, a cylindrical anvil slidable in the bore of said sleeve and including a first hollow portion concentric with said sleeve and having diametrally opposed axially elongated slots and a second solid portion having a diameter substantially equal to that of the second section of said detachable insert, a pin diametrally disposed on said sleeve and extending through said slots to limit displacement of said anvil relative to said sleeve, a head on the first portion of said anvil outside of and above said sleeve whereby forces may be applied to said anvil, a spring in the hollow portion of the anvil, said spring being effectively between said head and said pin to urge said head toward a normal position of rest relative to said sleeve and pin, and a rod on and extending axially from the solid portion of the anvil, said rod having a diameter substantially equal to but less than the diameter of the bore of the second section of the detachable insert whereby said rod serves as a guide for said anvil to drive said O-ring from the flared portion of the bore of said sleeve via the bore of said work piece into said groove, said second section of said detachable insert serving as to stop for said anvil; and a bifurcated spacer adapted to engage around said second section and having a height equal to the difference between said axial extents.

References Cited in the file of this patent

UNITED STATES PATENTS

| | | |
|---|---|---|
| 1,897,253 | Gaubert et al. | Feb. 14, 1933 |
| 1,939,553 | Hill et al. | Dec. 12, 1933 |
| 2,266,874 | Larson | Dec. 23, 1941 |
| 2,357,139 | Seme | Aug. 29, 1944 |
| 2,510,206 | Barkan et al. | June 6, 1950 |
| 2,586,087 | Reynolds et al. | Feb. 19, 1952 |
| 2,632,236 | Dodge | Mar. 24, 1953 |
| 2,741,021 | Hutton | Apr. 10, 1956 |
| 2,759,255 | Prince | Aug. 21, 1956 |
| 2,871,553 | Binder | Feb. 3, 1959 |
| 2,961,755 | Prince | Nov. 29, 1960 |